United States Patent [19]

Gautney et al.

[11] 3,739,278

[45] June 12, 1973

[54] RECEIVER DEMUTING ARRANGEMENT EMPLOYING SEQUENTIAL BINARY CODE

[75] Inventors: George E. Gautney; John Piombino, both of Annandale; Rowland S. Johnson, Springfield, all of Va.

[73] Assignee: Gautney & Jones, Falls Church, Va.

[22] Filed: June 29, 1971

[21] Appl. No.: 157,833

[52] U.S. Cl. ..................... 325/64, 325/38 R, 325/58

[51] Int. Cl. ............................................ H04b 1/00

[58] Field of Search .................. 325/53, 54, 55, 64, 325/302, 390, 392, 395, 141, 348, 478, 58, 51, 38 R

[56] References Cited

UNITED STATES PATENTS

| | | | |
|---|---|---|---|
| 3,510,777 | 5/1970 | Gordon | 325/64 |
| 3,335,406 | 8/1967 | Clark | 325/55 |
| 3,506,966 | 4/1970 | Magnuski | 325/55 |
| 3,268,664 | 8/1966 | Fleissner et al. | 325/302 |
| 3,475,558 | 10/1969 | Cahn | 325/55 |

*Primary Examiner*—Albert J. Mayer
*Attorney*—Rose & Edell

[57] ABSTRACT

In a highly reliable system for remotely and selectively demuting one or more of multiple receivers, an arrangement employing a sequential binary code wherein a transmitted carrier is selectively modulated or not in each of plural successive time frames throughout a multi-frame coding interval, each interval being bracketed by start and stop frames in which the carrier must be modulated. Remote receivers include decoding circuits arranged to recognize reception of one or more code combinations. Upon recognizing one of its assigned code combinations the decoding circuit demutes the receiver to render audible whatever program information appears on the carrier. Extremely high reliability is achieved by employing relatively long time frames of approximately 1 second and a very narrow modulation signal bandwidth of approximately 1.4 Hz. Reliability is extended even further by utilizing code combinations which differ from one another by at least 2 bits.

17 Claims, 5 Drawing Figures

INVENTORS
GEORGE E. GAUTNEY,
JOHN PIOMBINO &
ROWLAND S. JOHNSON
By Ross & Edell
ATTORNEYS

PATENTED JUN 12 1973 3,739,278

INVENTOR
GEORGE E. GAUTNEY,
JOHN PIOMBINO &
ROWLAND S. JOHNSON

By Rose & Edell
ATTORNEYS

INVENTORS
GEORGE E. GAUTNEY,
JOHN PIOMBINO &
ROWLAND S. JOHNSON

By Rose & Edell
ATTORNEYS

RECEIVER DEMUTING ARRANGEMENT EMPLOYING SEQUENTIAL BINARY CODE

BACKGROUND OF THE INVENTION

The present invention relates to remote control communication systems and, more particularly, to systems in which a transmitted signal is selectively modulated according to predetermined codes to control the demuting of multiple remote receivers. The invention is applicable to various systems in which an operation is to be controlled from a remote location; however, for purposes of describing a preferred embodiment, the description which follows relates to an emergency warning system in which different classes of multiple remote receivers may be individually demuted.

For purposes of remotely addressing one or more receivers of a multiplicity of receivers, it is necessary to code a transmitted carrier signal by appropriate modulation. One prior art approach to such coding takes the form of employing a different modulation frequency to demute each receiver or group of receivers. This requires that each receiver be provided with a narrow band filter for each modulation frequency to which it must respond. Where a receiver must respond to a large number of different frequencies, the combined cost of the large number of narrow band filters becomes prohibitive.

Apart from the economic factor, it is desirable that the modulation frequencies be kept in the range of 200 to 300 Hz. This is because the carrier may also be modulated by teletype transmission, which is adversely affected by frequencies below 200 Hz, and by audio transmission, which can be filtered to remain insensitive to modulation frequencies no higher than 300 Hz without significant loss of audio content. In the 200–300 Hz range it becomes a practical impossibility to obtain any significant number of discrete band pass filters, particularly where the number required is on the order of 100 or more.

Another approach to coding a carrier for purposes of selectively addressing different receivers employs multiple modulation tones simultaneously, the presence or absence of each tone representing a respective bit in a parallel binary code. The receivers in this case must have as many bandpass filters as there are coding tones, the number being dependent upon the number of individual addresses capable of transmission. For example, if the system has a 256 address capacity, and 8-bit binary code, employing eight coding tones, is required. The crowding of coding tones together is not a problem with this approach; however, each receiver is rather expensive by virtue of the requirement that it be capable of detecting all of the coding tones.

It is therefore an object of the present invention to provide a system of the type described wherein a minimum of different coding frequencies are required and the receiver cost is low. More specifically it is an object of the present invention to provide a receiver demuting arrangement suitable for use with multiple receivers which must be individually demuted wherein the same coding frequency may be employed for all receivers.

It is another object of the present invention to provide a remote control system whereby multiple remote operations may be individually controlled by transmitting a carrier modulated by a single coding tone.

The aforementioned objects are, as described below, achieved by utilizing a sequential binary code wherein a carrier is modulated or not in successive time frames with a single modulation tone. Sequential binary codes have not heretofore been effective in demuting schemes because of their extreme lack of reliability. The main reason for the lack of reliability relates to noise. Specifically, noise bursts are of such a nature as to make a receiver detect carrier modulation when no intended modulation is present. Receiver bandpass filters centered about the modulation frequency do not significantly reduce the effect of the noise since the filter bandwidths are necessarily quite large in order to permit effective response to the modulation tone occurring during the relatively short time frames of a few milliseconds or less. Since the filter passband must be relatively wide, the possibility of noise occurring in the passband is high; hence, the scheme is unreliable.

It is therefore an object of the present invention to employ a sequential binary code approach to receiver demuting wherein the problems of noise are significantly minimized.

SUMMARY OF THE INVENTION

In accordance with the present invention, carrier transmission is segmented into alternate coding and non-coding intervals. Coding intervals are further segmented into relatively long time frames (approximately 1 second) in which the carrier may be modulated or not by a single code tone. The code tone modulation pattern in each coding interval is therefore representative of a serial binary number. At each receiver the carrier is demodulated and the code tone is passed through a narrow band notch filter to an amplitude detector and integrator circuit. If the integrated signal achieves a preestablished threshold, indicating the code tone to have been detected for approximately one second, a squared pulse is generated for processing by decoding circuitry. The decoding circuitry examines the serial binary numbers represented by the presence or absence of squared pulses and demutes the receiver upon recognizing one or more pre-assigned binary addresses.

BRIEF DESCRIPTION OF THE DRAWINGS

The above and still further objects, features and advantages of the present invention will become apparent upon consideration of the following detailed description of specific embodiments thereof, especially when taken in conjunction with the accompanying drawings, wherein.

DESCRIPTION OF PREFERRED EMBODIMENTS

Figures 1, 2:
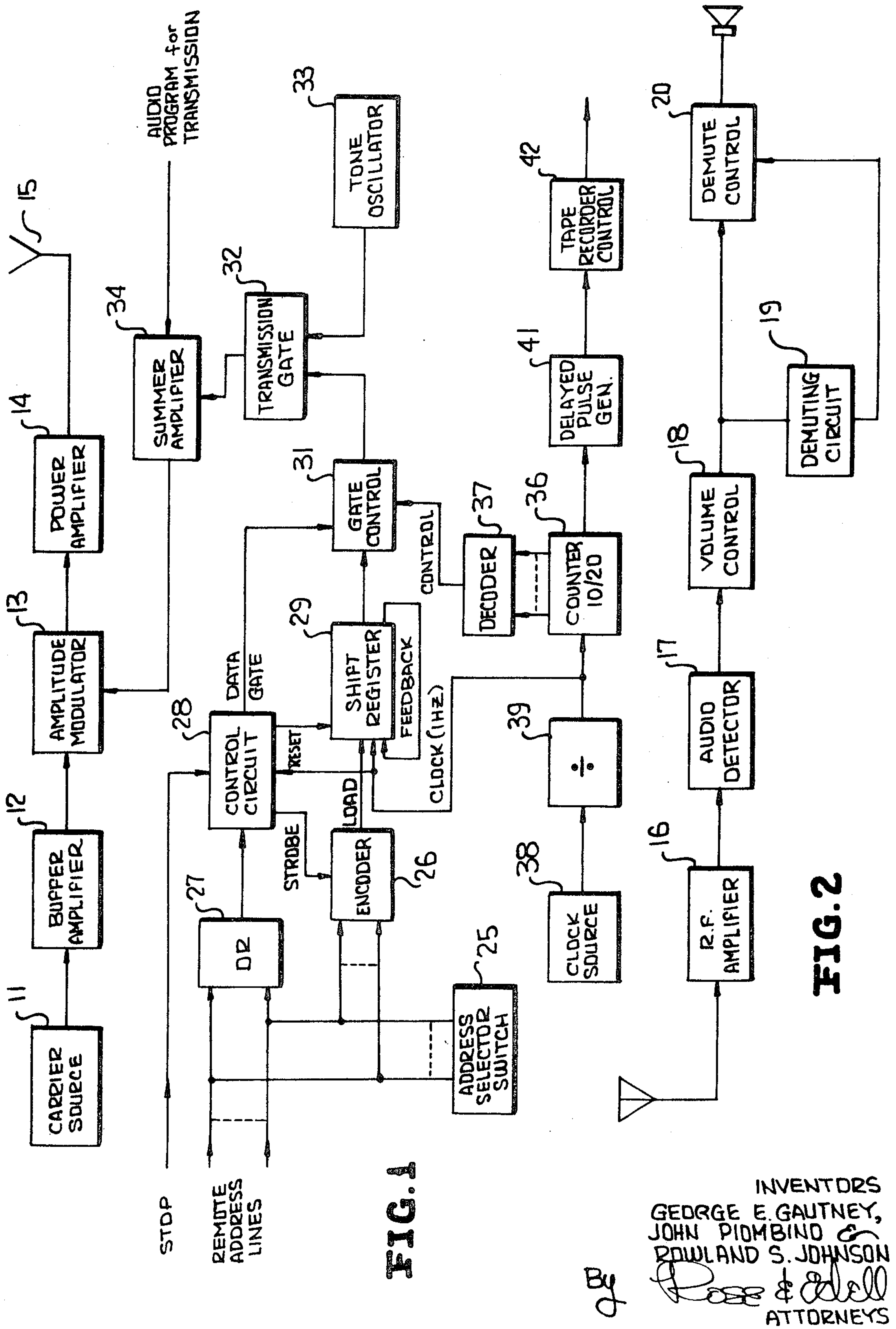
FIG. 1 is a functional block diagram of a transmitter employed in the system of the present invention.
FIG. 2 is a functional block diagram of a typical receiver employed in the system of the present invention.

Referring now to FIG. 1 of the accompanying drawings, a transmitter includes a source 11 of carrier signal which is amplified by buffer amplifier 12 and fed to an amplitude modulator 13. Modulation is applied to the carrier in the manner described hereinbelow, and the resulting modulated signal is amplified by power amplifier 14 and delivered to antenna 15 for transmission via a suitable transmission medium such as the atmosphere, cable, etc.

In FIG. 2 there is broadly illustrated a typical receiver employed in the present system. The signal transmitted by the receiver of FIG. 1 is received, amplified by amplifier 16 and any amplitude modulation is detected by audio detector 17. Such amplitude modulation may include audio program information, a demuting code, and possibly a teletype transmission. The detected signal is passed through volume control network 18 and fed to demuting circuit 19 which looks for one or more demuting codes assigned to the receiver. Upon recognizing an assigned demuting code, circuit 19 activates demute control 20 to permit passage of the audio signal to loudspeaker 21. Demute control 20 may, for example, comprise a relay which is pulled in by an actuation signal from circuit 19 to provide a connection between the volume control network 18 and speaker 21. In addition, demute control 20 may include a high pass filter for blocking passage of the demuting frequency to the speaker.

Referring again to FIG. 1, the elements therein as yet unmentioned may be referred to generally as a code generator. The function of the code generator is to modulate the carrier with a series binary code for the purpose of identifying the receiver or receivers which are to be demuted. The demuting code employed comprises 10 bits of data, each bit corresponding to a time frame of 1 second duration. (Of course the number of code bits is not limited to the value ten mentioned herein by way of example). With the exception of the first and last frames, each frame can be either a binary "1" (tone modulation) or a binary "0" (no tone modulation). The first and last frames must be binary "1" to provide coding start and stop pulses, respectively. The binary states of the other eight frames are determined by the demuting code to be transmitted. Since eight coding bits are available in the example, $2^8$ or 256 different 8-bit numbers may be transmitted, each number being capable of representing a receiver or group of receivers to be demuted.

The code generator is actuated by selecting one of multiple address lines, each address line being assigned a number corresponding to a respective binary code to be transmitted. The desired address line may be selected locally (at the transmitter) by means of a selector switch 25; alternatively, where the transmitter is part of a multi-transmitter system, the desired address line may be selected at a remote supervisory location. The selected address line actuates an encoder 26 arranged to provide a binary number corresponding to the number of the selected address line.

Selection of an address line also actuates OR gate 27 which in turn triggers a control circuit 28. The latter responds by first resetting a 10-bit shift register 29. Resetting of the shift register comprises forcing its first bit (start) and last bit (stop) in one state (for example "1") and forcing the other 8 bits into the opposite state (i.e. — "0"). After the shift register is reset, control circuit 28 provides a strobe pulse to encoder 26 which responds by loading shift register 29 with the binary number corresponding to the selected address line.

When the shift register is loaded, control circuit 28 provides a data gate signal which controls gate control logic 31. The latter is capable of providing a signal which opens a transmission gate 32 to permit passage of a coding tone from oscillator 33 to summer amplifier 34 and in turn to modulator 13. In addition to the data gate signal, gate control 31 requires a control signal from a counter 36, via decoder 37, before it can open transmission gate 31. Counter 36 is driven by a 1 Hz clock signal from clock source 38 and frequency divider 39 and produces the control signal at gate control 31 for 10 successive seconds of every 20 seconds.

The 1 Hz clock signal is also applied as a shift pulse to shift register 29, so that for each 10 second interval during which transmission gate 32 is on, the 10 binary signals stored in the shift register are applied to the transmission gate for one second each. For each binary "1" applied to transmission gate 32 from shift register 29, the transmitted carrier is modulated by the tone from oscillator 33 for one second. If a binary "0" is applied from the shift register, gate 32 is blocked and the tone does not modulate the carrier.

The modulation code from gate 32 is summed with the audio program signal at amplifier 34 so that both program and coding information may modulate the carrier.

Shift register 29 is provided with a feedback loop so that it continues to cycle, each cycle taking ten seconds (i.e. — clocking occurs at a 1 Hz rate and there are 10 shift register stages). However, because counter 36 and decoder 37 provide the control signal to gate control 31 only during alternate ten second intervals, the 10-second coding intervals are spaced by ten second non-coding intervals.

The delayed pulse generator 41 is activated once after the first address code is completed; at that time the addressed receiver(s) will have been demuted. The delayed pulse generator in turn triggers a tape recorder control unit to turn on a tape recorder (not shown). The tape recorder may, for example, comprise the source of the audio program signal; or, if such signal is otherwise provided, the tape recorder may be employed to record the otherwise provided audio signal.

Figure 3:
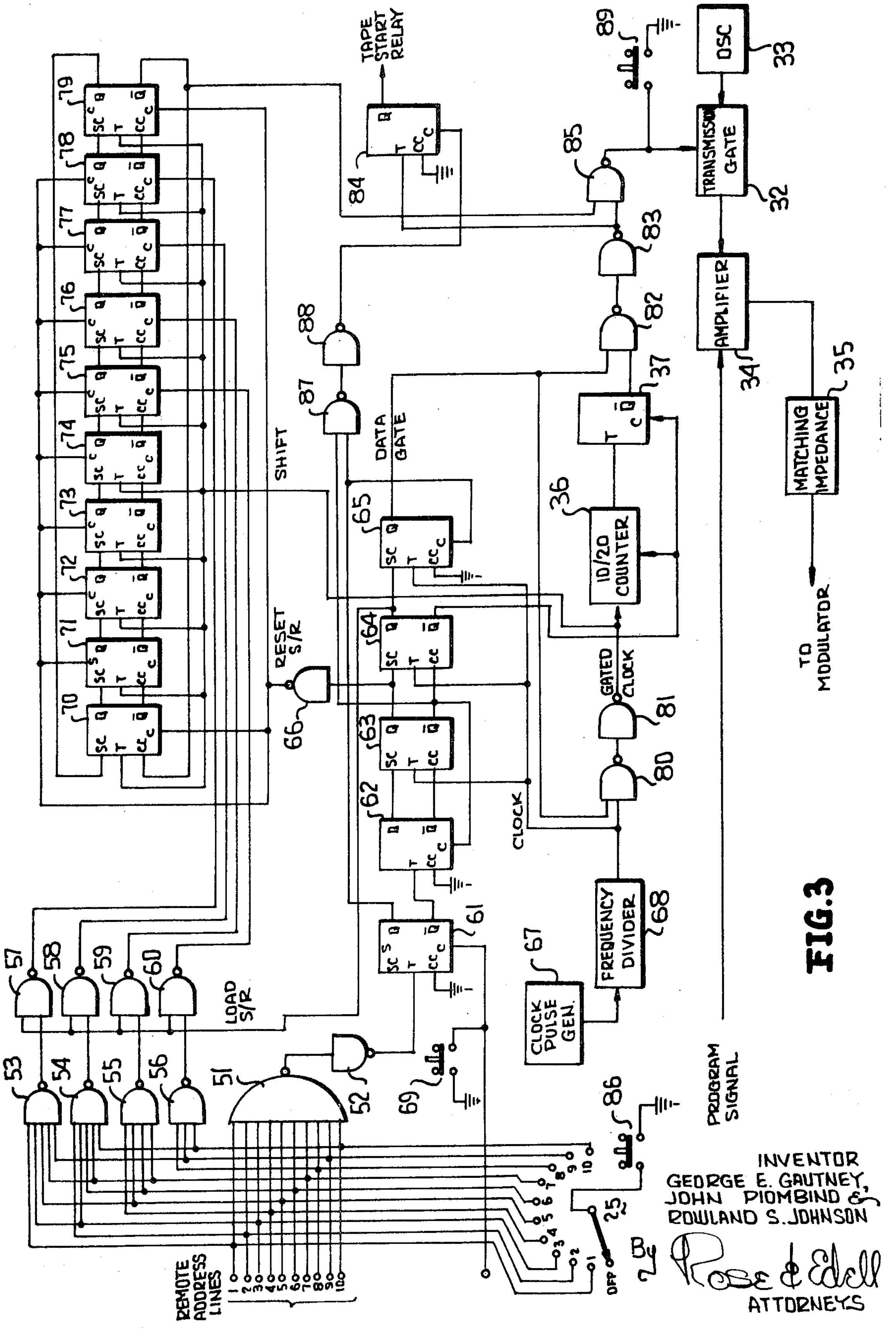
FIG. 3 is a detailed schematic diagram of the transmitter of FIG. 1.

The code generator, functionally illustrated in FIG. 1, is illustrated in greater detail in FIG. 3. The address line OR-function provided by gate 27 in FIG. 1 is effected by 10-input NAND gate 51 of FIG. 3. The input address lines are normally maintained at binary "1" level and are selected by individually grounding (to binary "0") the desired line. The output signal from NAND gate 51 is binary "0" when all inputs are "1," and is binary "1" when any input is binary "0." The output signal from NAND gate 51 is inverted by NAND gate 42 which feeds the clock input terminal (T) of a flip-flop 61. The latter is the first of five flip-flops, 61-65, inclusive, comprising control circuit 28 of FIG. 1, and is preferably the same as or similar to Texas Instrument Model No. 511. For ease in reference, and because this type of flip-flop is employed throughout the present system, the operation of flip-flops of this type are described briefly at this point. Data is applied to the flip-flop at either the set control (SC) or clear control (CC) terminals and is entered only in response to the leading edge (negative-going) of a binary "0" signal at the clock (T) terminal. A binary "1" at the SC terminal causes the flip-flop to switch to its set state when clocked, providing a binary "1" Q output signal and a binary "0" $\overline{Q}$ output signal. A binary "0" at the SC terminal produces the opposite state upon clocking. Similar operation, with opposite binary states, ensures in response to data signals applied to the CC terminal. In addition, the flip-flop may be set or cleared independently of the T, SC and CC terminals by applying a binary "0" signal to the set (S) or clear (C) terminals, respectively. If no inputs are applied to the SC and CC terminal, the flip-flop alternates states with successive clock pulses.

Flip-flop 61 has its CC terminal grounded (binary "0") so that it assumes a set state ($Q = 1$) when clocked. The $\overline{Q}$ output signal from flip-flop 61 is employed to clock flip-flop 62 whose CC terminal is also grounded. The Q and $\overline{Q}$ signals from flip-flop 62 are applied to the SC and CC terminals, respectively, of flip-flop 63, and the Q and $\overline{Q}$ signals from flip-flop 63 are applied to the SC and CC terminals, respectively, of flip-flop 64. The $Q$ output signal of flip-flop 64 is applied to the SC terminal of flip-flop 65, the CC terminal of which is grounded. Each of flip-flops 63, 64 and 65 is clocked by a 1 Hz clock signal emanating from frequency divider 68 driven by pulse generator 67. Additional input connections to flip-flops 61-65 include a stop signal to the C input terminal of flip-flop 61. The stop signal is normally binary "1" but may e grounded either locally, by switch 69, or at a remote location. Additional connections are provided: between the $\overline{Q}$ terminal of flip-flop 63 and the C terminal of flip-flop 62; and between the Q terminal of flip-flop 65.

The Q terminal of flip-flop 63 drives an inverter in the form of NAND gate 66 which in turn provides a reset signal to shift register 29, which comprises ten flip-flop stages 70 through 79 inclusive. The Q and $\overline{Q}$ terminals of each stage are connected to the SC and CC terminals, respectively, of the next stage to provide a conventional shift register. In addition, the Q and $\overline{Q}$ terminals of flip-flop 79 are fed back to the SC and CC terminals, respectively, of flip-flop 70 so that a 10 bit number can repetitively cycle through the shift register.

The reset signal from inverter 66 is applied to the C terminal of flip-flops 70 and 79, and the S terminal of flip-flops 71–78. The ten shift register flip-flops 70–79 Are clocked by a gated clock signal derived from NAND gate 81 which serves as an inverter for the output signal from two-input NAND gate 80. The latter receives the 1 Hz clock from frequency divider 68 and the Q signal (data gate) from flip-flop 65.

Encoder 26 of FIG. 1 is embodied by four NAND gates 53–56, inclusive in FIG. 3. These gates are connected in various combinations to the address lines such that the four gate output signals represent a binary number corresponding to address line number selected. Since all of the address lines are normally i.e. — when not selected) binary "1," the output signals from gates 53–56 are normally binary "0." If address line 7 is selected, for example, each of gates 53, 54, and 55 have one binary "0" input signal and therefore provide binary "1" output signals.

The output signals form gates 53, 54, 55, 56 are applied, respectively, to NAND gates 57, 58, 59, 60. These gates each also receive a load signal from the Q terminal of flip-flop 64. The output signal from NAND gates 57, 58, 59, 60 are applied to the C terminal of respective shift register stages 78, 77, 76, 75. Thus, when gates 57–60 are strobed by the load signal, the complement of the binary number represented by the output signals of gates 53–56 is present into stages 78, 77, 76, and 75 of the shift register.

At the time of presetting, stage 79 of the shift register corresponds to the start bit in the serial binary code to be transmitted. Likewise, stage 70 corresponds to the stop bit. Stage 78 through 71 correspond to code bits one through eight. For the present description, only a 10 address code capability has been assumed for ease in description and understanding. Therefore, only four of the shift register bits require presetting. However, it will be appreciated that the eight code bits in the shaft register have the capacity to represent 256 different codes if need be. Of course, the more addresses, the more extensive is the encoder logic, and one more more matrices could be employed to properly preset the shift register in response to selection of one address from 256. Also, of course, if the coding interval were expanded to more than 10 time frames, an additional shift register bit would be added for each time frame; each bit providing a 100 percent increase in the address capacity of the coding arrangement.

The gated clock signal from NAND gate 81 also drives the 10/20 counter which provides an output signal which alternates states every ten seconds. Each time this signal goes to binary "0" it clocks a flip-flop (encode 37) which alternates states in response to successive clock pulses. Counter 36 is reset to zero and flip-flop 37 is cleared whenever the $\overline{Q}$ signal of flip-flop 64 goes to binary "0." The $\overline{Q}$ signal from flip-flop 37 is applied to two-input NAND gate 82 which also receives the data gate from flip-flop 65 as an input signal. NAND gate 82 drives inverter (NAND gate) 83 which feeds both the T terminal of a tape drive flip-flop 84 and one input terminal of a two-input NAND gate 85. The second input to NAND gate 85 is the $\overline{Q}$ signal from flip-flop stage 79 in the shift register.

NAND gate 85, when binary "0," actuates transmission gate 32 to pass the coding tone from oscillator 33 to amplifier 34 where the tone is summed with the audio program signal and applied to the carrier modulator via impedance matching circuitry 35. As will be more evident from the following description of an operational example, when the data gate is binary "1," NAND gate 85 is operative during alternate 10 second intervals to actuate or inhibit gate 32 for each of 10 one-second time frames according to the ten binary states stored in the shift register.

To illustrate the operation of the circuit of FIG. 3, assume first that all of the address lines are binary "1" i.e. — none are selected), and that flip-flops 61 and 62 are in their clear state as they must be at this time. The clock signal from frequency divider 68 continuously clocks flip-flops 63–65 at a 1 Hz rate; but because flip-flop 62 is in its clear state, the following flip-flops cannot be switched to their set states. Since the data gate signal is binary "0," NAND gate 80 is kept in its "1" state and NAND gate 82 in its "0" state, thereby inhibiting the gated clock signal. Thus there is no shifting in the shift register and no counting in the 10/20 counter 36. The binary "0" data signal also holds NAND gate 82 at binary "1" and NAND gate 83 at binary "0," thereby holding NAND gate 85 at binary "1" to keep transmission gate 32 closed.

Assume now that address line 5 is selected. This may be done by remotely momentarily grounding line 5 or by placing selector switch 25 at position 5 and depressing switch 86 (for at least 2 seconds). NAND gates 53 and 55 immediately assume binary "1" states, whereas gates 54 and 56 remain "0," and the corresponding signals are applied to gates 57–60. In addition, NAND gate 51 provides a binary "1" signal to inverter 52 which responds by clocking flip-flop 61. The latter assumes its set state and its binary "0" $\overline{Q}$ signal clocks flip-flop 62. The latter also assumes its set state, so that upon the next occurring 1 Hz clock pulse (clock pulse No. 1 in this sequence) flip-flop 63 is set. When flip-flop 63 is set, it clears flip-flop 62. In addition it resets the shift register, via NAND gate 66, to provide binary "0" in the start and stop bits and binary "1" in all other bits.

The next succeeding 1 Hz clock pulse (pulse No. 2) sets flip-flop 64 (because flip-flop 63 was set) and clears flip-flop 63 (because flip-flop 62 was cleared). The setting of flip-flip 64 strobes gates 57–60 to load the shift register with the complement of the binary number represented by gates 53–56. Upon being set, flip-flop 64 also resets counter 36 and flip-flop 37, the latter now providing a binary "1" $\overline{Q}$ signal to gate 82 which is still maintained binary "1" by the binary "0" data gate.

The next 1 Hz clock pulse (No. 3) sets flip-flop 65 (because flip-flop 64 was set) and clears flip-flop 64 (because flip-flop 63 was cleared). The setting of flip-flop 65 provides a binary "1" data gate signal which enables gate 80 to permit generation of the gated clock pulse signal, whereupon counter 36 begins counting. The binary "1" data gate also enables gate 82, causing binary "1" to be applied from gate 83 to gate 85. The latter at this time is also receiving the binary "1" start bit from the $\overline{Q}$ terminal of the shift register stage 79. Since both input signals to NAND gate 85 are "1," it provides a "0" to actuate transmission gate 32; the coding tone is thus applied to the modulator.

The next clock pulse (No. 4) has no effect at flip-flops 61–65 but does produce a gated clock pulse which adds a count at counter 36 and shifts the shift register bits one stage each. Since we assumed address number 5 to have been selected, a binary one $\overline{Q}$ signal will once again be provide by stage 79 and transmission gate 32 remains open. The next clock pulse (No. 5) shifts the register contents again, and thus a "0" $\overline{Q}$ signal from stage 79 switch gate 85 to binary "1," closing transmission gate 32. Thus during this one second time frame no modulation appears on the carrier.

In like manner, each of the bits in the address code open or close transmission gate 32 according to the bit state. After the entire ten bit code has been shifted (i.e. — after clock pulse No. 12), counter 36 clocks flip-flop 37 which changes state to inhibit opening of transmission gate 32. This inhibition remains in force for ten clock pulses, whereupon the state of flip-flop 37 once again changes and the 10 code bits once again sequentially gated through NAND gate 85 to open or close the transmission gate in ten respective time frames.

The tape control flip-flop 84 is clocked by the output signal from NAND gate 83. Since the CC terminal of this flip-flop is grounded, the flip-flop is set when clocked. This occurs after the ten code bits have been transmitted and the first non-coding interval begins. Flip-flop 84 remains set, actuating the tape recorder, for as long as the current address remains in force; that is, for as long as the circuit of FIG. 3 continues to alternate between coding and non-coding intervals.

When it is desired to terminate the current code transmission, the stop signal, normally at binary "1," is momentarily switched to binary "0." This may be done remotely or by means of switch 69 and simply requires momentary grounding of the stop signal line. This immediately clears flip-flop 61 which in turn immediately clears flip-flop 65 to render the data gate signal binary "0." This inhibits generation of gated clock pulses at NAND gate 80 and also prevents opening of transmission gate 32 by holding NAND gate 82 in its binary "1" state. In addition, clearing of flip-flop 61 operates, via NAND gates 87 and 88, to clear tape control flip-flop 84 and deactuate the tape recorder. Operation may be resumed for any address by momentarily (2 seconds or more) grounding the desired address line.

As an additional feature there is provided a switch 89 capable of actuating transmission gate 32 on manual command and thereby continuously modulate the carrier with the code tone for as long a period as desired.

Figure 4:
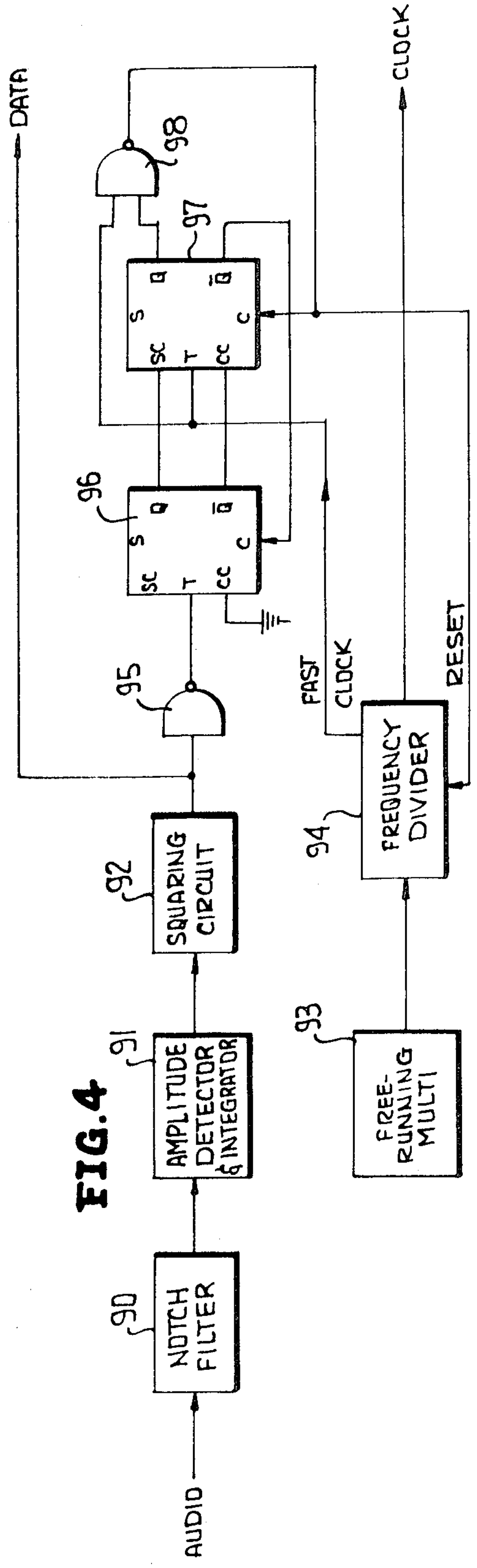
FIG. 4 is a schematic diagram of a portion of the receiver of FIG. 2.

Referring now to FIG. 4, there is illustrated in detail a portion of the demuting circuit 19 of FIG. 2. The audio signal is applied to a high-Q notch filter 90 tuned to pass only the tone provided by oscillator 33 of FIG. 1 and 3. Filter 90 may be an active filter, a resonant read filter, or any high Q notch filter arrangement. For example, the filter may have a pass band of 1.4 Hz at the 3 db points, the extremely narrow pass band being made possible by the relatively long bit or frame time of 1 second. The filtered signal, which may be amplified if necessary, is then amplitude detected and integrated by circuit 91. When the integrated signal amplitude exceeds a predetermined threshold, the signal is digitized by squaring circuit 92 to develop sharp data pulses which can be reliably processed in the circuit of FIG. 5. Specifically, if the code tone is detected for approximately 1 second i.e. — the coding time frame duration), squaring circuit 92 provides a binary "1" signal. By this technique, noise burst, of short duration are not able to affect operation of the system.

Figure 5:
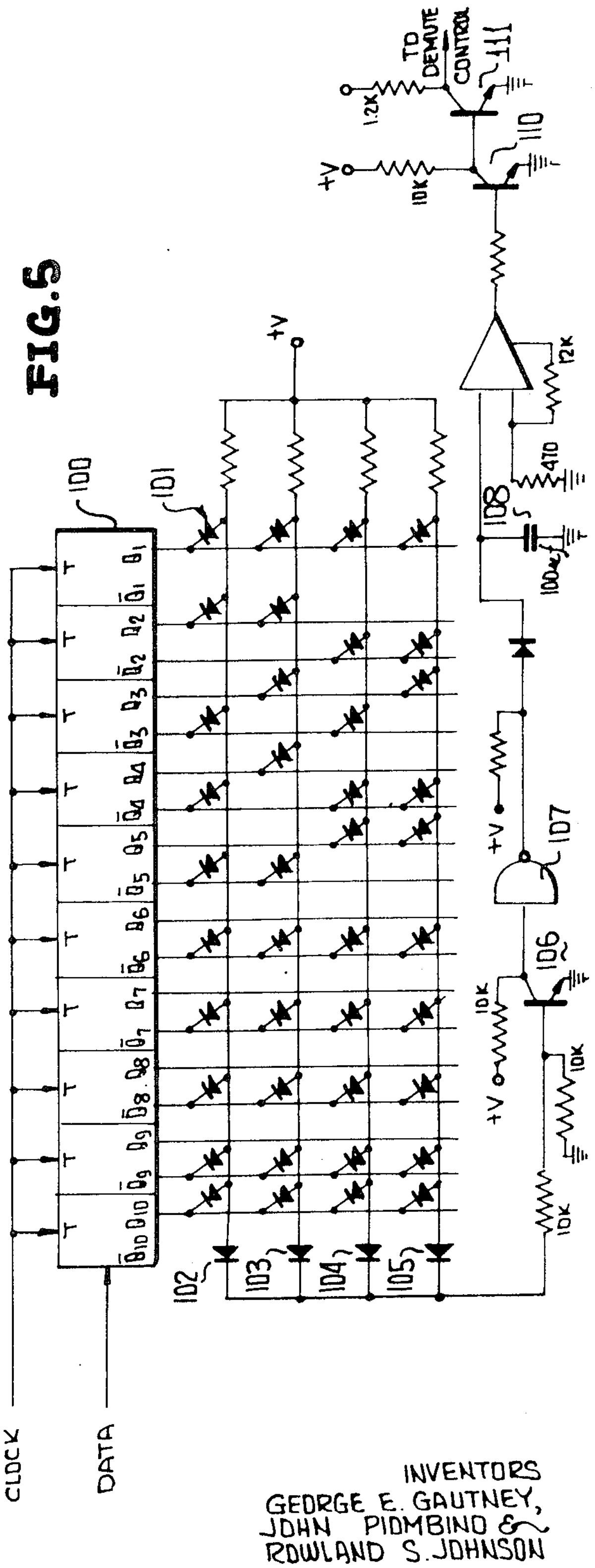
FIG. 5 is a schematic diagram of another portion of the receiver of FIG. 2.

The remainder of the components in FIG. 4 relate to the generation of a clock signal required to process the data in the circuit of FIG. 5. The clock source is a free-running multivibrator 93 driving a frequency divider 94 which provides an output clock train at approximately 1 Hz. It is desirable that this clock signal be synchronized with the 1 Hz time frames of the incoming address code. To effect synchronization, each detected and squared data pulse (binary "1") is inverted by NAND gate 95 and clocks a flip-flop 96 which has its CC terminal grounded. When clocked, flip-flop 96 is set. A fast clock train is provided by divider 94 at about 16 times the repetition rate of the output clock signal provided by decoder 94. The fast clock is used to clock a second flip-flop 97 which has its SC and CC terminals connected to the Q and $\overline{Q}$ terminals, respectively, of flip-flop 96. The fast clock is also applied to a NAND gate 98 to which the Q signal from flip-flop 97 is applied. The output signal from gate 98 is applied to the C terminal of flip-flop 97 and as a reset signal for divider 94. In addition the $\overline{Q}$ signal of flip-flop 97 is applied to the C terminal of flip-flop 96.

In operation, the fast clock effectively strobes flip-flop 97 many times during each one second time frame. However, as long as flip-flop 96 is in the clear state, clocking of flip-flop 97 cannot switch the latter from its clear state. The binary "0" Q signal from flip-flop 97 maintains NAND gate 98 in its binary "1" state in which it has in effect on either divider 94 of flip-flop 97.

When a data pulse is received, flip-flop 96 is clocked to its set state. On the next negative-going transition of the fast clock train, flip-flop 97 is set, causing its $\overline{Q}$ signal to go to "0" and immediately clear flip-flop 96. The Q signal of flip-flop 97 goes to "1" to prime NAND gate 98. On the next positive-going transition of the fast clock, NAND gate 98 goes to "0" and rests both flip-flop 97 and divider 94. Thus divider 94 is synchronized to the transmitted time frame by each detected data pulse.

Referring to FIG. 5, the clock signal generated in the circuit of FIG. 4 is employed as a shift pulse for a ten bit shift register which is also arranged to receive the data pulses which are digitized in the circuit of FIG. 4. The bits in shift register 100 are numbered inversely of the order in which they receive the data pulses and the various Q and $\overline{Q}$ signals are identified further by the stages from which they emanate. Thus, signal Q1 emanates from the Q terminal of stage 1, $\overline{Q}4$ emanates from terminal $\overline{Q}$ of stage 4, etc. Stage 1 corresponds to the start bit and stage 10 to the stop fit for decoding purposes.

A diode matrix 101 is employed to provide an output signal when the 10 bits in the shift register correspond to a number assigned to the receiver and in response to which the receiver is intended to demute. In the example illustrated, the receiver is intended to demute for codes 10000000011, 1000001111, 1000010001, and 1000010101. For each address to which the receiver must respond there is provided in the matrix a 10 diode AND gate, the anodes of the diodes being connected to a positive voltage and the cathodes to the appropriate shift register output terminals. All four AND gates are combined in an OR gate comprising four respective diodes 102, 103, 104, 105. The OR gate output is binary "1" whenever the number in the shift register corresponds to one of the four AND gate codes. The duration of the OR gate binary "1" signal is 1 second, corresponding to the clock period. The OR gate pulse is buffered by transistor amplifier 106 and inverter 107 and is then applied to pulse stretching capacitor 108. The discharge time constant for capacitor 108 is selected to effectively stretch each one second pulse to 40 or 50 seconds. Since the current address is transmitted every 20 seconds, the receiver can miss one entire coding interval without muting.

Operational amplifier 109 acts as a threshold detector for the pulse-stretching capacitor and maintains a high level output signal as long as the voltage across capacitor 108 is above a pre-established level. When the operational amplifier output signal is high, transistor 110 is conductive, cutting off transistor 111 to demute the receiver. When capacitor 108 is discharged, the operational amplifier is low, transistor 110 cut off, and the demute control signal is shorted to ground.

The start and stop bits are essential in each address since the bit stream enters a receiver shift register 100 and the contents of the shift register are constantly being examined by the diode matrix coincidence gates. The coincidence gates are enabled only when the start and stop bits are detected. Were it not for the reframing bits, spurious demuting could occur whenever the displacement of some undesired code matches the coincidence gate.

Another potential problem would arise if demuting codes were sent repeatedly one after another. The second half of an undesired code, as an example, and the first half of the same code might constitute a desired code and the receiver would improperly demute. This problem is avoided by sending the code during alternate time intervals. The transmission of a 10 bit code interval is followed by the transmission of a non-coding interval of 10 blanks. This clears the shift register before the transmission of the next code stream. The demuting system is a driven system meaning that the receiver remains demuted as long as the code is transmitted. This method has an advantage over a single code transmission followed by a "holding tone," because it provides the opportunity to demute even in the event that the receiver has failed to demute on the first, second, etc., code streams. Only 20, 40, and 60 seconds of voice program can be lost, which is better than no response at all. The pulse-stretcher time constant, internal to the receiver, allows it to remain demuted for a minimum of 40 seconds. Since a bit time of 1 second has been chosen for the system and in view of previous discussion, the demuting code is received at 20 second intervals, one code may be missed by the receiver without dropout provided that no two subsequent codes go undetected.

An important aspect of the present invention is the utilization of a relatively long interval (approximately 1 second) for each time frame. This feature permits an extremely narrow pass band (approximately 1.4 Hz) for notch filter 90, thereby increasing the signal-to-noise ratio of the system by eliminating most of the noise spectrum from the receiver decoding circuits. In addition, the long time frame permits the amplitude-detected code tone to be integrated (at circuit 91) so that squaring circuit 92 can be made responsive only to a code tone frequency existing for a relatively long time interval. This latter feature effectively eliminates short duration noise spikes as a source of false triggering.

Still further immunity from noise may be had by employing only specified ones of various possible sequential binary codes or addresses. More particularly, considering the eight address bits employed in the illustrative example, the address 0000000 should not be used because it is the reset state of shift register 100, and the address 1111111 should also be eliminated from use since, with the START and STOP bits, it corresponds to a continuous tone of ten seconds duration. Just how probable it is that ten seconds of the selected code tone will appear within the bandwidth of the receiving system from undesired sources is not amenable to mathematical analysis, but, intuitively, it would appear to be more probable than the appearence of the audio tone interrupted in a properly coded time sequence.

One other choice of permissible 8-bit binary address codes affords relative noise immunity. Inversion of a single bit in the coded address will not only cause the addressed output device to fail to demute, but, if received at other locations, can cause an output device whose address differs by this single inversion to demute. Thus a single bit inversion can cause a failure of the addressed output device to demute and, at the same time, can demute unintended output devices. To decrease the probability of this happening the 254 addresses remaining after elimination of the two mentioned above can be divided into two groups, (Group A and Group B) having the characteristic that any address in one group differs from any other address in the same group by at least two bits. The addresses in Group A are listed below in Table I; those in Group B are listed in Table II.

TABLE I
GROUP A ADDRESSES

Each address in this Group differs by at least two bits from any other address in the Group.

| | | | | |
|---|---|---|---|---|
| 00000000 (a) | 00000011 | 00000101 | 00000110 | 00001001 |
| 00001010 | 00001100 | 00001111 | 00010001 | 00010010 |
| 00010100 | 00010111 | 00011000 | 00011011 | 00011101 |
| 00011110 | 00100001 | 00100010 | 00100100 | 00100111 |
| 00101000 | 00101011 | 00101101 | 00101110 | 00110000 |
| 00110011 | 00110101 | 00110110 | 00111001 | 00111010 |
| 00111100 | 00111111 | 01000001 | 01000010 | 01000100 |
| 01000111 | 01001000 | 01001011 | 01001101 | 01001110 |
| 01010000 | 01010011 | 01010101 | 01010110 | 01011001 |
| 01011010 | 01011100 | 01011111 | 01100000 | 01100011 |
| 01100101 | 01100110 | 01101001 | 01101010 | 01101100 |
| 01101111 | 01110001 | 01110010 | 01110100 | 01110111 |
| 01111000 | 01111011 | 01111101 | 01111110 | 10000001 |
| 10000010 | 10000100 | 10000111 | 10001000 | 10001011 |
| 10001101 | 10001110 | 10010000 | 10010011 | 10010101 |
| 10010110 | 10011001 | 10011010 | 10011100 | 10011111 |
| 10100000 | 10100011 | 10100101 | 10100110 | 10101001 |
| 10101010 | 10101100 | 10101111 | 10110001 | 10110010 |
| 10110100 | 10110111 | 10111000 | 10111011 | 10111101 |
| 10111110 | 11000000 | 11000011 | 11000101 | 11000110 |
| 11001001 | 11001010 | 11001100 | 11001111 | 11010001 |
| 11010010 | 11010100 | 11010111 | 11011000 | 11011011 |
| 11011101 | 11011110 | 11100001 | 11100010 | 11100100 |
| 11100111 | 11101000 | 11101011 | 11101101 | 11101110 |
| 11110000 | 11110011 | 11110101 | 11110110 | 11111001 |
| 11111010 | 11111100 | 11111111 (a) | | |

(a) For reasons explained in the text, the first and last address of this group should not be used.

TABLE II

GROUP B ADDRESSES

Each address in this group differs from any other address in the group by at least two bits.

| | | | | |
|---|---|---|---|---|
| 00000001 | 00000010 | 00000100 | 00000111 | 00001000 |
| 00001011 | 00001101 | 00001110 | 00010000 | 00010011 |
| 00010101 | 00010110 | 00011001 | 00011010 | 00011100 |
| 00011111 | 00100000 | 00100011 | 00100101 | 00100110 |
| 00101001 | 00101010 | 00101100 | 00101111 | 00110001 |
| 00110010 | 00110100 | 00110111 | 00111000 | 00111011 |
| 00111101 | 00111110 | 01000000 | 01000011 | 01000101 |
| 01000110 | 01001001 | 01001010 | 01001100 | 01001111 |
| 01010001 | 01010010 | 01010100 | 01010111 | 01011000 |
| 01011011 | 01011101 | 01011110 | 01100001 | 01100010 |
| 01100100 | 01100111 | 01101000 | 01101011 | 01101101 |
| 01101110 | 01110000 | 01110011 | 01110101 | 01110110 |
| 01111001 | 01111010 | 01111100 | 01111111 | 10000000 |
| 10000011 | 10000101 | 10000110 | 10001001 | 10001010 |
| 10001100 | 10001111 | 10010001 | 10010010 | 10010100 |
| 10010111 | 10011000 | 10011011 | 10011101 | 10011110 |
| 10100001 | 10100010 | 10100100 | 10100111 | 10101000 |
| 10101011 | 10101101 | 10101110 | 10110000 | 10110011 |
| 10110101 | 10110110 | 10111001 | 10111010 | 10111100 |
| 10111111 | 11000001 | 11000010 | 11000100 | 11000111 |
| 11001000 | 11001011 | 11001101 | 11001110 | 11010000 |
| 11010011 | 11010101 | 11010110 | 11011001 | 11011010 |
| 11011100 | 11011111 | 11100000 | 11100011 | 11100101 |
| 11100110 | 11101001 | 11101010 | 11101100 | 11101111 |
| 11110001 | 11110010 | 11110100 | 11110111 | 11111000 |
| 11111011 | 11111101 | 11111110 | | |

A further aspect of the present invention relates to the possibility of its utilization on a nation-wide basis wherein plural transmitters are employed to cover the entire country. Under such conditions, transmitters in adjacent regions could utilize different carrier frequencies. Since a receiver tuned to one carrier frequency would not respond to an address broadcast on another carrier frequency, the same address codes can be duplicated in adjacent regions without fear of interaction. For three carrier frequencies this approach provides 3 × 128 = 384 address. Nor is 128 the maximum number of addresses available on a single carrier frequency. By selecting different audio code tones, the total number of addresses can be used again with no interference. This feature, of course, requires the different narrow-band filters 90 to match the desired tone, but this does not alter the essential nature of the demute device and does allow expansion, if needed, to accommodate any conceivable addressing requirement.

In some cases it may be highly desirable to have differing audio tones. For example, there may be conditions where, at night, the sky wave of, say, the carrier of one regional station will encroach on the ground wave service area of another regional station using the same carrier. To avoid accidental demuting of unintended output devices, it is only necessary to use different audio tones for the two stations. Due to the high selectivity of filter 90, these tones may be relatively close in frequency.

While we have described and illustrated specific embodiments of our invention, it will be clear that variations of the details of construction which are specifically illustrated and described may be resorted to without departing from the true spirit and scope of the invention as defined in the appended claims.

What is claimed is:

1. A communications system of the type wherein a transmitter is selectively controllable to demute different groups of one or more remote receivers, said transmitter comprising:
   - a source of carrier signals;
   - a source of modulation signals;
   - a clock circuit for generating a series of pulses defining successive equal time frames;
   - means for continuously defining successive alternating coding and non-coding intervals, each comprising the same number of said successive time frames;
   - code selection means for at will designating by coded signals which group of receivers is to be demuted; and
   - decoding means responsive to said coded signals designated at said code selection means for modulating said carrier signal with said modulation signal during certain time frames in said coding interval, and inhibiting modulation of said carrier signal by said modulation signal during the remaining time frames in said coding interval, the combination of said certain time frames being different for each different group of designated receivers, said coded signals being such that said carrier signal is modulated by said modulation signal during the first and last time frame of each coding interval.

2. The communications system according to claim 1 wherein said coded signals comprise an N-bit binary number, each group of designated receivers being identified by a different N-bit combination, and wherein said decoding means comprises:
   - an N-bit shift register arranged to receive the selected N-bit number;
   - means for shifting the contents of said shift register one stage during each time frame in said coding interval, said shifting of shift register contents being in the direction of an output stage of said shift register;
   - a transmission gate for selectively passing said modulation signal or not according to the binary state of the output stage of said shift register; and
   - a modulator for receiving said carrier signal and said modulation signal when passed by said transmission gate to modulate said carrier signal with said modulation signal.

3. The system according to claim 2 wherein each remote receiver includes:

means for receiving said carrier signal when transmitted by said transmitter;

demodulator means for separating said modulation signal from said received carrier signal;

means for defining a decoding interval comprising a plurality of successive decoding time frames, the number and duration of decoding time frames in said decoding interval being the same as the number and duration of time frames in said coding interval;

a receiver shift register;

means for serially shifting an N-bit binary number into said receiver shift register, 1 bit during each decoding interval time frame, the state of the bit shifted into said shift register during each time frame being a first binary state if modulation signal is separated from said received carrier signal during that time frame, and a second binary state if no modulation signal is separated from said received carrier signal during that time frame; and receiver decoding means responsive to the binary number in said receiver shift register for demuting said receiver when the contents of said receiver shift register correspond to one or more pre-established N-bit numbers, said receiver decoding means comprising means for providing a pulse when the contents of said receiver shift register correspond to said one or more pre-established N-bit numbers, and means responsive to said pulse for applying a demuting signal to said receiver for a duration in excess of successive coding and non-coding intervals.

4. The system according to claim 1 wherein each remote receiver includes:

means for receiving said carrier signal when transmitted by said transmitter;

demodulator means for separating said modulation signal from the received carrier signal;

means for defining a decoding interval comprising a plurality of successive decoding time frames, the number and duration of decoding time frames in said decoding interval being the same as the number and duration of time frames in said coding interval;

receiver decoding means responsive to the presence or absence of separated modulation signal during the time frames in each decoding interval when the pattern of modulation signal presence and absence corresponds to a pre-established pattern.

5. The system according to claim 4 wherein said time frames are each approximately one second in duration and wherein said receiver includes a notch filter for passing said modulation signal separated from said received carrier, said notch filter having a pass band of approximately 1.4 Hz centered about the frequency of said modulation signal.

6. The system according to claim 5 further comprising a integrator for receiving signal passed by said notch filter, said integrator having a charging time constant on the order of magnitude of the duration of said time frames.

7. A system for selectively actuating one or more of a plurality of remotely located devices, individually or in predetermined groups, said system comprising:

a transmitter including:

a source of carrier signal;

means for defining continuously alternating coding and non-coding time intervals, said non-coding time intervals being at least as long in duration as said coding intervals, said coding intervals being divided into a predetermined number *n* of successive time frames of equal duration;

a source of modulation signal;

means for deriving an *n*-bit binary number wherein the states of at least some of the bits are variable at will;

means for selectively modulating said carrier signal with said modulation signal during said coding intervals such that in each of said n time frames the carrier is modulated or not according to the state of a respective bit in said *n*-bit number, the derived *n*-bit numbers being constrained such that the first and last bits are in a first binary state, which state is such that said carrier signal is modulated during the first and last time frames of each coding interval;

means for transmitting the modulated carrier signal to said remotely located devices;

a receiver located at each remote device, said receiver comprising:

means for receiving the modulated carrier transmitted from said transmitter;

demodulator means for separating said modulation signal from the received modulated carrier;

means for defining a continuous series of equal time frames at said receiver, equal in duration to the time frames at said transmitter;

means for generating an *n*-bit binary signal at said receiver in which each bit assumes a state determined by whether the received signal is modulated or not during *n* respective successive receiver time frames; and control means responsive to one generation of a predetermined *n*-bit number at said receiver for immediately actuating said device.

8. The system according to claim 7 wherein said control means includes means for generating a control signal pulse to actuate said device in response to generation of said predetermined *n*-bit number at said receiver, said system further comprising holding means responsive to said control signal pulse for applying a holding signal to said device to maintain said device actuated for a period of time equal to at least one coding and one non-coding time intervals after termination of said control pulse.

9. The system according to claim 8 wherein said holding means applies said holding signal to said device for a period of time approximately equal to two coding and two non-coding time intervals.

10. The system according to claim 8 wherein said system is a communications system, wherein said carrier is additionally modulated by an information signal, and wherein said device includes transducer means arranged to respond to said information signal only as long as said device is actuated.

11. The system according to claim 10 wherein said means for defining said time intervals at said transmitter comprises:

means for providing a series of clock pulses successively spaced in time by a period equal to said time frame;

a counter for counting said clock pulses; and count decoder means responsive to the counts registered by said counter for providing a gating signal for a period of n successive counts out of every $2n$ counts;

said system further comprising a register for storing the derived $n$-bit number, and wherein said means for selectively modulating comprises:

a modulator;

gating means for applying said modulation signal to said modulator in response to application of a specified signal to said gating means; and logic means for sampling the state of successive bits of the n-bit number stored in said register during corresponding successive periods of said clock pulses, said logic means including means responsive to the sampled bit being in said first binary state in time coincidence with the gating signal provided by said count decoder means for applying said specified signal to said gating means.

12. The system according to claim 11 wherein said means at said receiver for defining a continuous series of time frames comprises:

externally synchronized means for providing clock pulses successively spaced in time by a period equal to said time frame; and means responsive to separation of said modulation signal by said demodulator means for time-synchronizing the clock pulses provided by said externally synchronized means to the time frame of the separated modulation signal; and wherein said means for generating an $n$-bit binary signal at said receiver includes a shift register having at least $n$-stages and which, in response to successive synchronized clock pulses, shifts one binary state or the other from stage to stage, the binary state entering the first shift register stage being determined by the presence or absence of separated modulation signal at said demodulator means during each synchronized clock pulse period.

13. The system according to claim 12 wherein said control means at said receiver comprises a logic matrix connected to said shift register and arranged to provide said control signal when the $n$-bits present in said n shift register stages correspond to said predetermined $n$-bit number.

14. The system according to claim 10 wherein said means at said receiver for defining a continuous series of time frames comprises:

externally synchronized means for providing clock pulses successively spaced in time by a period equal to said time frame; and means responsive to separation of said modulation signal by said demodulator means for time-synchronizing the clock pulses provided by said externally synchronized means to the time frame of the separated modulation signal; and wherein said means for generating an $n$-bit binary signal at said receiver includes a shift register having at least $n$-stages and which, in response to successive synchronized clock pulses, shifts one binary state or the other from stage to stage, the binary state entering the first shift register stage being determined by the presence or absence of separated modulation signal at said demodulator means during each synchronized clock pulse period.

15. The system according to claim 10 wherein the predetermined $n$-bit numbers to which said control means responds at different receivers differ in the states of at least 2 bits.

16. The system according to claim 10 wherein said time frames are approximately one second in duration, and wherein said receiver includes a notch filter for passing said separated modulation signal to said means for generating.

17. The system according to claim 16 wherein said filter has a pass band of approximately 1.4 Hz centered about the frequency of said modulation signal.

* * * * *